Jan. 8, 1952     C. A. HARLESS     2,581,656
BEARING SUPPORT FOR PRINTING PRESSES
Filed April 25, 1947     2 SHEETS—SHEET 1

INVENTOR
CHARLES A. HARLESS
BY
ATTORNEYS

Jan. 8, 1952     C. A. HARLESS     2,581,656

BEARING SUPPORT FOR PRINTING PRESSES

Filed April 25, 1947     2 SHEETS—SHEET 2

INVENTOR
CHARLES A. HARLESS
ATTORNEYS

Patented Jan. 8, 1952

2,581,656

UNITED STATES PATENT OFFICE 2,581,656

BEARING SUPPORT FOR PRINTING PRESSES

Charles A. Harless, Riverside, Conn., assignor to R. Hoe & Co., Inc., New York, N. Y., a corporation of New York Application April 25, 1947, Serial No. 743,743

2 Claims. (Cl. 308—184)

This invention relates to improvements in printing presses and more particularly in cylinder bearing supports therefor.

An object of the invention is to provide an improved bearing support for a printing press cylinder which will absorb and dampen vibration.

Still another object of the invention is to provide such a vibration absorbing bearing support which may be readily and cheaply manufactured.

With these and other objects which will appear in the following full description in mind, the invention consists in the combinations and arrangements of parts and details of construction which will now first be fully described in connection with the accompanying drawing and then be more particularly pointed out in the appended claims.

Figure 1:
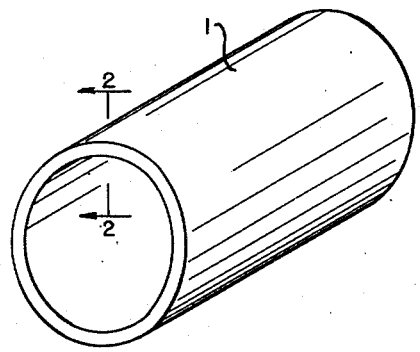
Figure 1 is an isometric diagrammatic view of a vibration absorbing bushing.
Figure 3:
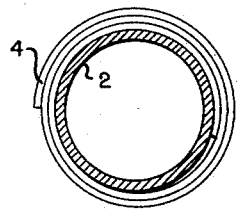
Figure 3 is a schematic illustrating the method of formation of the bushing of Figure 1.

Vibration absorbing elements in the form of a large number of layers of thin sheet metal, generally copper, and in which the vibration energy is absorbed by extremely thin viscous layers, generally oil and air, between the various layers of sheet metal are known. Such elements have been formed by stacking the successive layers of metal or by winding them spirally and collapsing the spirally wound structure. In neither case has the vibration absorbing body been well adapted to forming an antivibration member for a printing cylinder bearing, where it is desired to absorb vibration forces in all directions. According to the present invention, a vibration absorbing member in the form of a bushing or tube 1, as shown in Figure 1, is provided, such bushing preferably comprising inner and outer tubular shells 2 and 3 of steel or other suitable metal having a large number of layers of thin sheet copper 4 compressed between them and the entire structure being welded together at the ends 5 so as to form a sealed unit. In forming such a structure, the copper 4 may be wound up on the inner shell 2, as indicated in Figure 3, where the continuous strip 4 is largely exaggerated in thickness and only a few layers are shown, so as to permit of illustration. The copper may also be wound on a separate mandrel and thereafter be compressed on the tube 2. An extremely thin film of oil and air will be retained between the successive wraps of the copper strip 4, forming viscous layers therebetween. This structure may now be compressed, if necessary, or in some cases the winding tension on the copper strip may be utilized for creating sufficient compression. The other tube 3 is now placed in position and may be drawn down or otherwise compressed so as to provide a snug fit and compress the layers of copper to the desired extent. The whole assembly is welded together at the ends to produce the bushing of Figures 1 and 2, and may be turned and finished for smoothness and concentricity. The outside of shell 3 will preferably be of somewhat reduced diameter adjacent its ends, or the inside diameter of shell 2 will be somewhat increased, adjacent its ends, so that weight will be borne by the central section and layers of copper therein, rather than by the welds at the ends.

Figure 2:
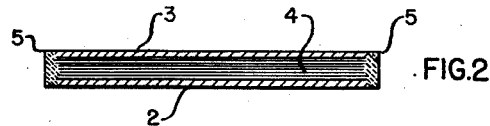
Figure 2 is a longitudinal section therethrough, the thickness being exaggerated.
Figure 4:
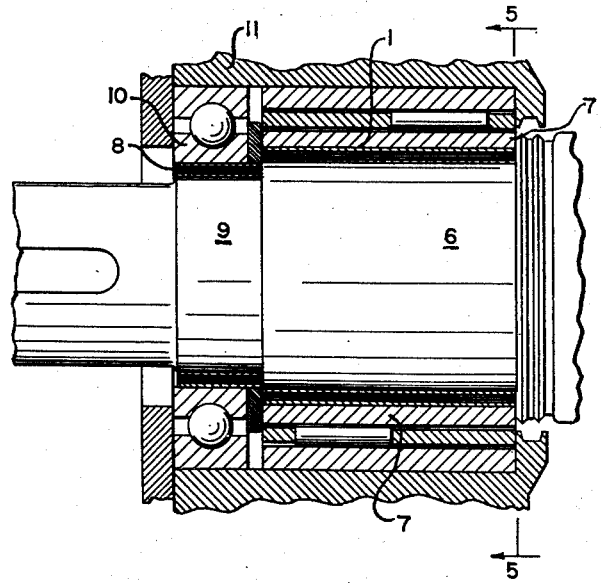
Figure 4 is a longitudinal cross section through a printing cylinder bearing.
Figure 5:
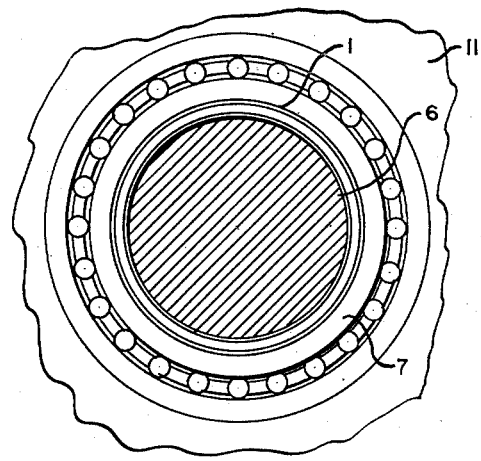
Figure 5 is a section on the line 5—5 of Figure 4.

The bushing of Figures 1 and 2 may be placed over the printing cylinder journal 6, as indicated in Figures 4 and 5, being interposed between the journal 6 and the inner race of an anti-friction bearing 7. A similar vibration absorbing bushing 8 may be interposed between the reduced portion 9 of the cylinder journal and the inner race of an anti-friction thrust bearing 10. It will be seen that the vibratory stresses will now be isolated from the frame 11 through the vibration absorbing bushings.

Figure 7:
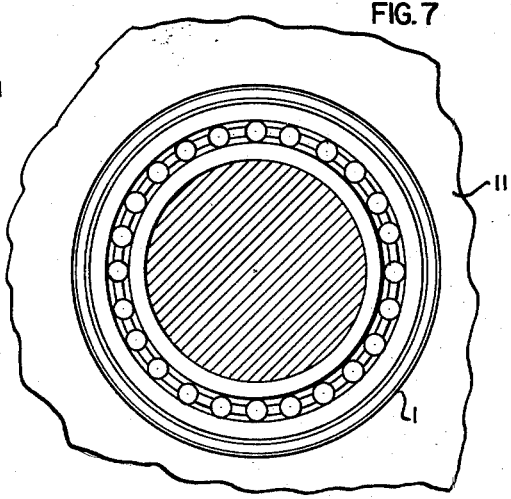
Figures 6 and 7 are views similar to Figures 4 and 5, respectively, but showing a modified form of the invention.
Figure 6:
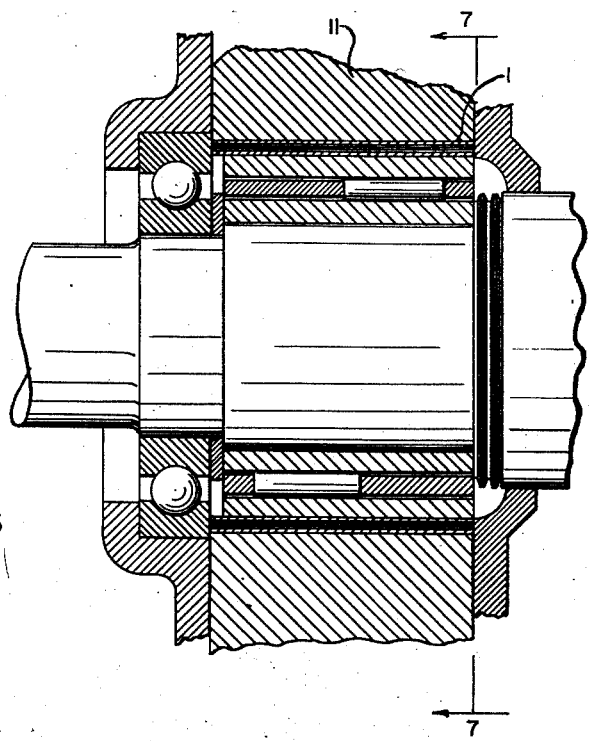

As shown in Figures 6 and 7, the vibration absorbing bushing 1 may also be interposed between the outer race of the anti-friction bearing and the frame 11, where preferred.

Either form of construction provides for absorbing vibration energy by means of viscous friction between the layers of copper or other thin metal layers within the bushing 1. The high viscous friction introduced at this point effectively damps such vibrations and prevents their transmission to and through the frame structure, as well as preventing the building up of any resonant conditions during press operation. As will be readily understood, a compressive force exerted by the cylinder journal against the bushing 1 will tend to squeeze the layers thereof together. This, however, forces the very thin layer of oil between the layers of copper circumferentially of the bushing so that the compressing action is opposed by the viscous friction between such thin layers of oil and the successive layers of copper, permitting absorption of any vibration and conversion of the same into heat energy without the rebound tendencies inherent in elastic cushioning systems.

Where heavy printing pressures are involved, the construction of Figures 4 and 5 will normally be preferred. In this construction, it will be observed that the main printing pressure is not applied against the same arc of the bushing, at all times, but the line of compression rotates around the bushing continuously as the cylinder rotates. In this way, squeezing out of the oil film between layers is prevented and there will, at all times, be a cushioning viscous film between the successive layers of copper all around the circumference of the bushing.

The vibration absorbing bushing of the invention may be applied to any or all of the printing cylinders of a printing press, including the design cylinder or impression cylinder, or in the case of an offset press, any or all of the plate, blanket and impression cylinders.

What is claimed is:

1. In a printing press, the combination with a cylinder journal and its bearing of a vibration absorbing bushing interposed between the journal and bearing and rotating with the journal, the said bushing comprising inner and outer tubular shells, a spirally wound strip of thin sheet metal having its successive layers separated by, and only by, viscous films and being compressed between said shells.

2. In a printing press, the combination with a cylinder journal and its bearing of a vibration absorbing bushing interposed between the journal and bearing and rotating with the journal, the said bushing comprising inner and outer tubular shells, a spirally wound strip of thin sheet metal having its successive layers separated by, and only by, viscous films and being compressed between said shells, and the said strip and shells being welded together at the edges of the strip to form a seal.

CHARLES A. HARLESS.

REFERENCES CITED

The following references are of record in the file of this patent:

UNITED STATES PATENTS

| Number | Name | Date |
|---|---|---|
| 513,367 | Parsons | Jan. 23, 1894 |
| 1,370,599 | Leon | Mar. 8, 1921 |
| 2,403,489 | Birmann | July 9, 1946 |
| 2,407,400 | Chamberlain | Sept. 10, 1946 |

FOREIGN PATENTS

| Number | Country | Date |
|---|---|---|
| 43,243 | Sweden | Nov. 7, 1917 |
| 241,256 | Switzerland | June 17, 1946 |
| 786,485 | France | Sept. 3, 1935 |